Jan. 31, 1956

G. W. DUNHAM 2,732,572

LAWN, GROUND AND WALK SWEEPERS

Filed Dec. 24, 1952

INVENTOR.
GEORGE W. DUNHAM
BY
Chapin & Neal
ATTORNEY.

INVENTOR.
GEORGE W. DUNHAM
BY Chapin & Neal
ATTORNEY.

Jan. 31, 1956
G. W. DUNHAM
2,732,572
LAWN, GROUND AND WALK SWEEPERS
Filed Dec. 24, 1952
3 Sheets-Sheet 3
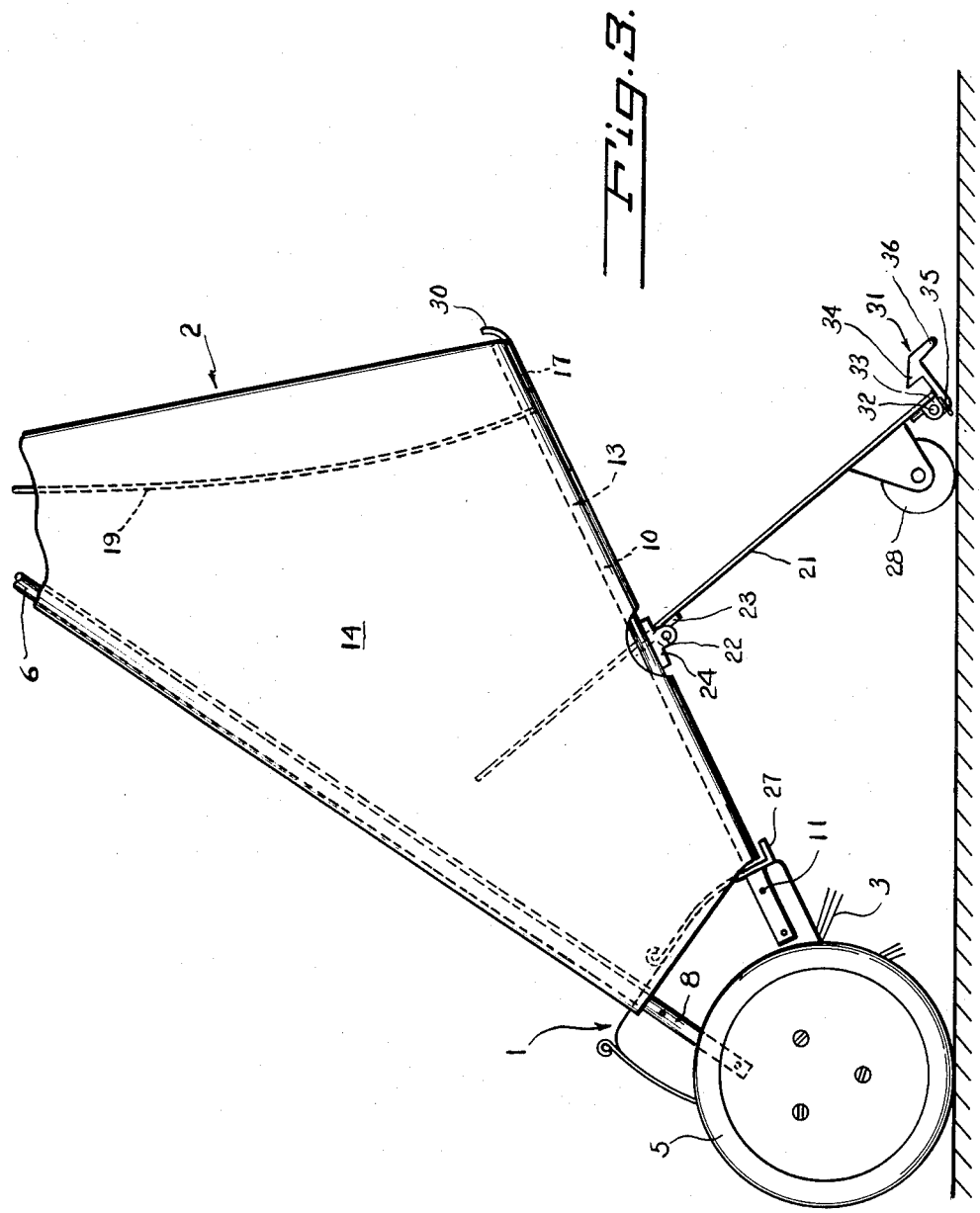
INVENTOR.
GEORGE W. DUNHAM
BY Chapin & Neel
ATTORNEY.

United States Patent Office 2,732,572
Patented Jan. 31, 1956

2,732,572

LAWN, GROUND, AND WALK SWEEPERS

George W. Dunham, Westport, Conn., assignor to Savage Arms Corporation, Utica, N. Y., a corporation of Delaware Application December 24, 1952, Serial No. 327,886

1 Claim. (Cl. 15—79)

This invention relates to an improvement in sweepers for removing litter such as grass cuttings, leaves, and the like from lawns, walks and other ground surfaces, and more particularly to an improved hopper structure in which the litter is collected in the operation of the sweeper.

One object of the invention is the provision of a hopper structure which facilitates emptying the collected litter from the hopper.

A further object is to provide a structure by means of which the hopper can be emptied without awkward manipulation of the sweeper as a whole and without scattering of the litter in the emptying operation.

Other and further objects and advantages residing in the details of construction will be made apparent in the following specification and claims.

In the accompanying drawings:

Fig. 3 is a view similar to Fig. 1 but showing the parts in hopper discharging position.

Figure 1:
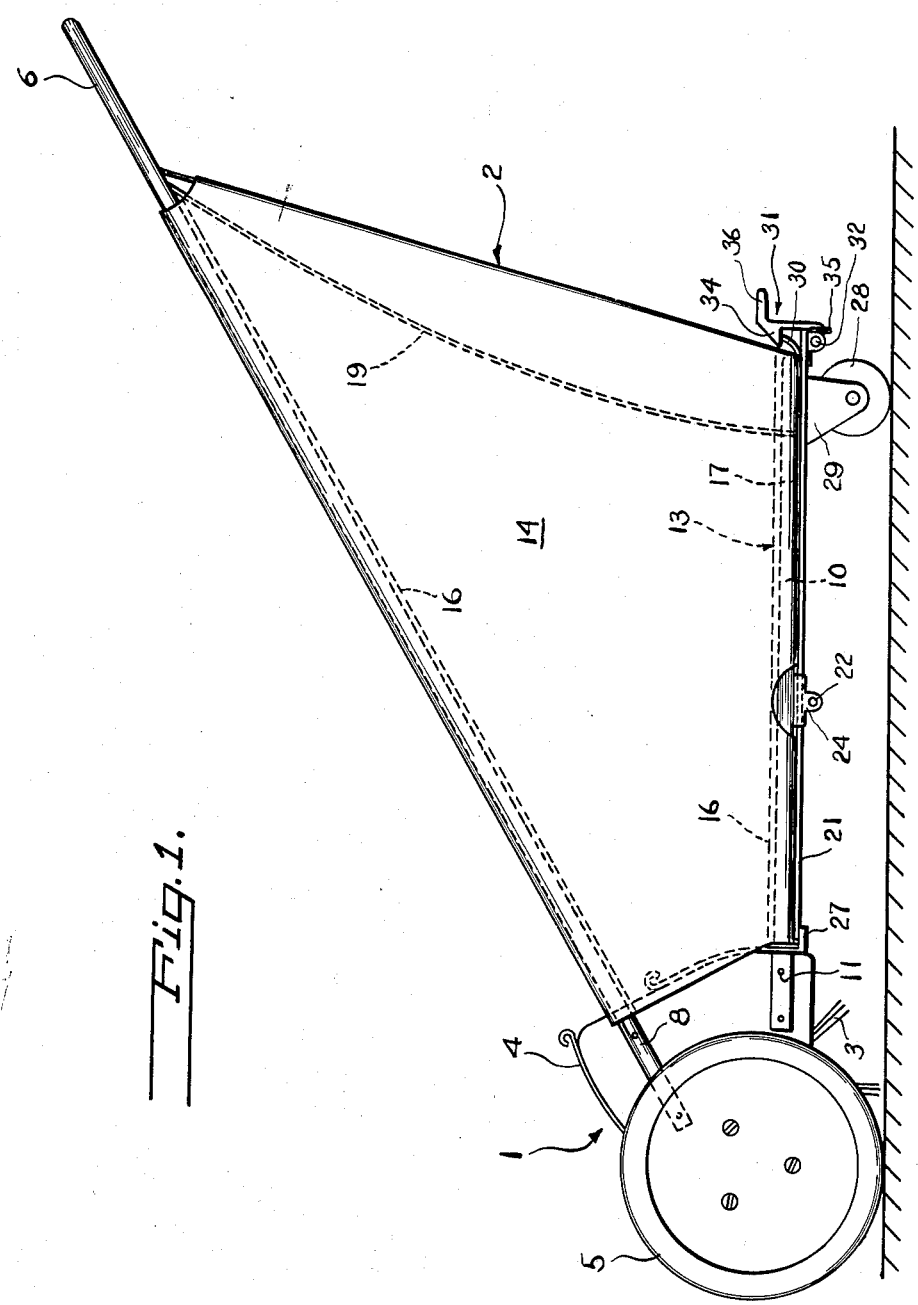
Fig. 1 is a side elevational view of a sweeper embodying the invention, the parts being shown in litter collecting position.

Referring to the drawings, the sweeping or brush portion of the sweeper is generally indicated at 1 and the hopper portion at 2. The sweeping elements include, a rotatable brush 3 carried by a sweeper frame structure, generally indicated at 4, supported by a spaced pair of ground engaging and brush driving wheels 5 about the axis of which the sweeper structure is tiltable.

Except as herein specifically pointed out the sweeping structure may take any desired form, the form shown being that which is disclosed in my copending application Serial No. 289,733 filed May 24, 1952.

As shown, the sweeper is propelled forwardly by a U-shaped handle 6 having side members 7 suitably connected at their forward ends to the sweeper frame, as indicated at 8, and connected adjacent their rear ends by a cross bar 9.

A pair of spaced frame side members 10 are connected at their forward ends to the sweeper frame, by any suitable means such as screw bolts 11, and extend rearwardly therefrom. The rear ends of members 10 are connected by a rear frame member 12, which, with the side frame members 10, forms an open frame structure generally indicated at 13.

Side wall members 14 and a rear wall member 15 are respectively connected along their upper edges to side members 7 and cross bar 9, and along their lower edges to frame side members 10 and the rear frame member 12, respectively.

The wall members 14 and 15 may be formed of any suitable material but preferably and as shown they are formed of canvas or the like and are connected to the members 7, 9, 10 and 12 by stitched hems or loops 16.

Secured in any suitable manner to the under side of frame 13 at its rear corners are gusset pieces 17, formed with seats 18. A pair of spring struts 19 are connected at their upper ends to the cross bar 9 and the lower ends of said struts are adapted to be releasably engaged in the seats 18 to resiliently maintain the handle 6 in elevated position and the wall members 14 and 15 in substantially taut hopper forming condition.

Figure 2:
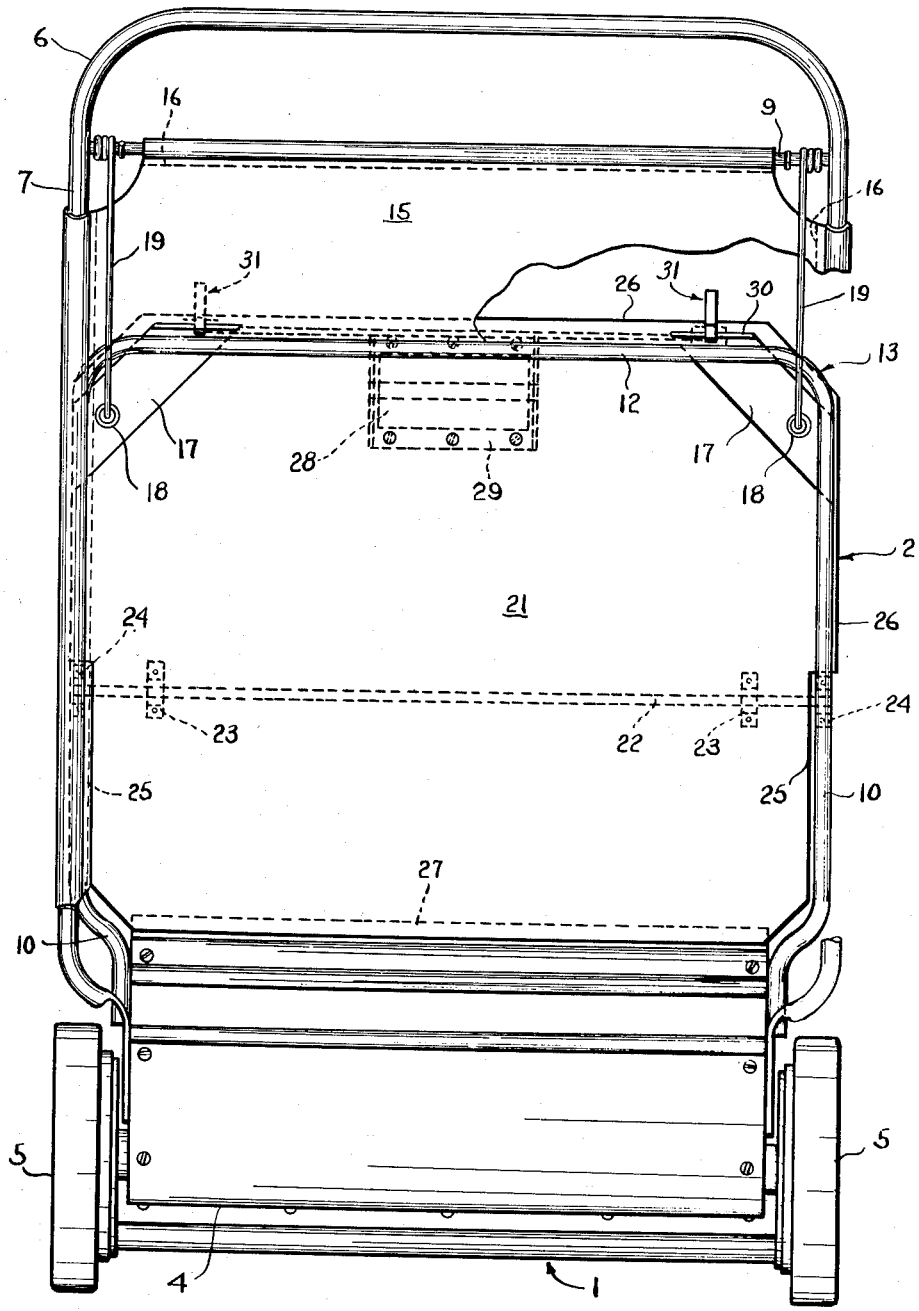
Fig. 2 is a plan view, parts being broken away, of the structure shown in Fig. 1.

A hopper floor member 21 is pivoted intermediate its ends to the frame side members 10. As shown, a rod 22 is secured to the underside of member 21 by straps 23, the ends of rods 22 extending outwardly of the side edges of member 21 and pivotally engaging in brackets 24 secured to the side members 10. The sides of member 21 are cut away as indicated at 25 at and forwardly of the rod 22 so that the forward portion of the member 21 lies within the frame 13, while the edges of the rear portion of the floor member extend, in part at least, outwardly beneath the side and rear frame members 10 and 12 as at 26 so that in the normal operative position of the sweeper, as shown in Figs. 1 and 2, the rear portion of the frame member 13 rests on the rear portion of the floor member. Preferably the sweeper frame is provided with a rearwardly extending flange 27 upon which the forward edge of the floor member engages when the parts are in the operative position of Fig. 1. Preferably also the floor member 21 is provided at its rear portion with a ground engaging and hopper supporting roller 28 rotatably mounted in a bracket 29 riveted or otherwise secured to the under side of the floor member.

As will be apparent in the normal operating position of the parts the engagement of the extending portions 26 with frame members 10 and 12 maintains the floor member in closed position. When, however, the handle 6 is raised to tilt the hopper upwardly and forwardly as in Fig. 3 raising the pivot rod 22 the forward portion of the floor member forwardly of the pivot is tilted upwardly and rearwardly relative to the pivotal axis while the remaining portion of said floor member rearwardly thereof is tilted downwardly and forwardly. This is due to the fact that pivot rod 22 is positioned forwardly of the center of gravity of the floor member. The contents of the hopper are thus discharged down the rearwardly inclined floor member, a short forward movement of the sweeper serving to draw the floor member from beneath the pile of discharged litter. By the described arrangement the hopper is emptied without awkward or strength consuming manipulation of the sweeper or scattering of the hopper contents such as occurs when the hopper is turned completely over, either forwardly or sidewise as is necessary in conventional construction. The necessity of bracing the sweeper frame and parts against the strains of conventional hopper emptying manipulation is avoided making possible a lighter and more efficient sweeper construction, increasing the useful life of the sweeper and decreasing manufacturing costs.

While in some cases the engagement of the frame 13 with the floor extensions 26 are adequate to maintain the parts in operative relation during sweeping operation, additional or alternative means for releasably maintaining the floor member 21 in closed position are preferably provided in the form of a positive but releasable latch mechanism between the frame 13 and floor 21. A preferred construction for the purpose is shown in the drawings. One or both of the corner gusset members 17 are extended rearwardly of rear frame member 12 as at 30, these extensions being curved upwardly as shown. A pair of latch members 31 are fixed to a rod 32 which is journaled at its ends in brackets 33 fixed to the underside of the floor member. The latches 31 are formed with a lug portion 34 adapted to engage over the extensions 30 to hold the floor member 21 and frame 13 substantially rigidly together. The latches are normally held in engaging position by an elbow 35 spring wound around the rod 32 and having one end engaging the underside of floor member 21 and the other end engaging one of the latches 31. The latches are provided with rearward extensions 36 by which the latches may be released by the foot of the sweeper operator to permit tilting of frame 13, as described, to effect discharge of the hopper contents.

What is claimed is:

In a lawn sweeper including a sweeper frame structure supported on a pair of spaced ground engaging wheels, and a U-shaped propelling handle extending rearwardly from said frame and having side members connected at their forward ends to the sweeper frame and connected adjacent their rear ends by a cross bar; a pair of spaced frame side members connected at their forward ends to the sweeper frame and extending rearwardly therefrom, a rear frame member connecting the rear ends of said frame side members and forming therewith an open frame, flexible hopper forming side and rear wall members respectively connected along their upper edges to said handle side members and cross bar and along their lower edges to said frame side members and said rear frame member, gusset members extending across the rear corner portions of said open frame and fixed thereto, spring struts connected at their upper ends to said cross bar, the lower ends of said struts releasably engaging said gusset members to hold said flexible hopper wall members extended between the frame and handle members to which they are attached, a hopper floor member pivoted intermediate its ends to the side members of said open frame on a transverse axis positioned forwardly of the center of gravity of the floor member to cause the forward portion of the latter to tilt upwardly and rearwardly and the rearward portion of the floor member to tilt downwardly and forwardly about said pivotal connection to the open frame side members upon upward and forward tilting of the open frame, and latch means mounted at the rear edge of said floor member, at least one of said gusset members being extended rearwardly of said frame for releasable engagement by said latch means.

References Cited in the file of this patent

UNITED STATES PATENTS

| | | |
|---|---|---|
| 737,100 | Hamlin | Aug. 25, 1903 |
| 1,439,724 | Blynn | Dec. 26, 1922 |
| 2,579,103 | Whittaker | Dec. 18, 1951 |
| 2,654,106 | Parker | Oct. 6, 1953 |

FOREIGN PATENTS

| | | |
|---|---|---|
| 483,452 | Canada | May 20, 1952 |